(12) United States Patent
Nevada (10) Patent No.: US 10,169,786 B2
(45) Date of Patent: Jan. 1, 2019

(54) METHOD AND APPARATUS FOR REPURCHASING ITEMS

(71) Applicant: PAYPAL, INC., San Jose, CA (US)

(72) Inventor: Giselle Katrina Nevada, Pflugerville, TX (US)

(73) Assignee: PAYPAL, INC., San Jose, CA (US)

(*) Notice: Subject to any disclaimer, the term of this patent is extended or adjusted under 35 U.S.C. 154(b) by 637 days.

(21) Appl. No.: 13/707,732

(22) Filed: Dec. 7, 2012

(65) Prior Publication Data
US 2014/0164158 A1    Jun. 12, 2014

(51) Int. Cl.
G06Q 30/00    (2012.01)
G06Q 30/06    (2012.01)

(52) U.S. Cl.
CPC ................ *G06Q 30/0601* (2013.01)

(58) Field of Classification Search
CPC . G06Q 30/0601–30/0645; G06Q 30/06–30/08
USPC .............................. 705/26.1–27.2
See application file for complete search history.

(56) References Cited

U.S. PATENT DOCUMENTS

| | | | |
|---|---|---|---|
| 2001/0032130 A1* | 10/2001 | Gabos | G06Q 30/02 705/14.13 |
| 2003/0065805 A1* | 4/2003 | Barnes, Jr. | 709/231 |
| 2006/0100925 A1* | 5/2006 | Finaly | G06Q 20/387 705/14.35 |
| 2010/0128297 A1* | 5/2010 | Redd | G03D 15/005 358/1.13 |
| 2011/0225064 A1* | 9/2011 | Fou | G06Q 20/12 705/26.41 |
| 2012/0150677 A1* | 6/2012 | Shuster | G06Q 30/0601 705/26.1 |
| 2013/0030915 A1* | 1/2013 | Statler | G06Q 30/06 705/14.54 |

* cited by examiner

*Primary Examiner* — Ethan D Civan
(74) *Attorney, Agent, or Firm* — Haynes and Boone, LLP (57) ABSTRACT

The present disclosure involves a system. The system includes a computer memory storage module configured to store executable computer programming code. The system includes a computer processor module operatively coupled to the computer memory storage module. The computer processor module is configured to execute the computer programming code to perform the following operations: associating a digital identifier with a merchandise item; receiving notification that the merchandise item has been sent to a buyer; thereafter detecting a submission of the digital identifier from the buyer; and initiating, in response to the detecting, a reorder of the merchandise item for the buyer.

26 Claims, 6 Drawing Sheets

METHOD AND APPARATUS FOR REPURCHASING ITEMS

BACKGROUND

Technical Field

The present disclosure generally relates to electronic commerce, and more particularly, to an improved system and method for ordering a merchandise item.

Related Art

The recent rapid advances in computer technology and telecommunications have increased the popularity of electronic commerce. Electronic commerce is becoming more and more prevalent, with an ever-increasing number of merchants that may or may not have a physical real world counterpart. Furthermore, the services offered by these merchants have been improving as well. The popularity of electronic commerce is partially attributable to the ease and convenience of making a transaction electronically—for example online—instead of at a physical location. However, conventional ways of conducting electronic commerce may still have drawbacks. For example, a buyer or a prospective buyer may be required to enter payment and address information each time he/she orders a product from a merchant, which can be a cumbersome process and therefore may decrease the buyer's satisfaction with the overall transaction.

Therefore, although conventional ways of conducting electronic commerce have been generally adequate for their intended purposes, they have not been entirely satisfactory in every aspect. What is needed is an improved way of conducting electronic commerce that offers a more hassle-free experience for the buyer or prospective buyer.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As mobile computing and communication technologies continue to advance, electronic commerce is becoming increasingly more prevalent. For example, the popularity of electronic commerce is partially attributed to the ease and convenience of these transactions. However, conventional ways of conducting electronic commerce may involve some cumbersome processes for a buyer or a prospective buyer. For example, the buyer or prospective buyer may be forced to enter his/her payment and address information in order to complete the checkout process. In some cases, the buyer or prospective buyer may also need to speak with a representative of the merchant that is offering the merchandise item for sale. These processes slow down the transaction and may annoy the buyer or prospective buyer, thereby resulting in a less satisfactory shopping experience.

The present disclosure describes an improved way to conduct electronic commerce that overcomes these drawbacks associated with conventional electronic commerce discussed above.

Figure 1:
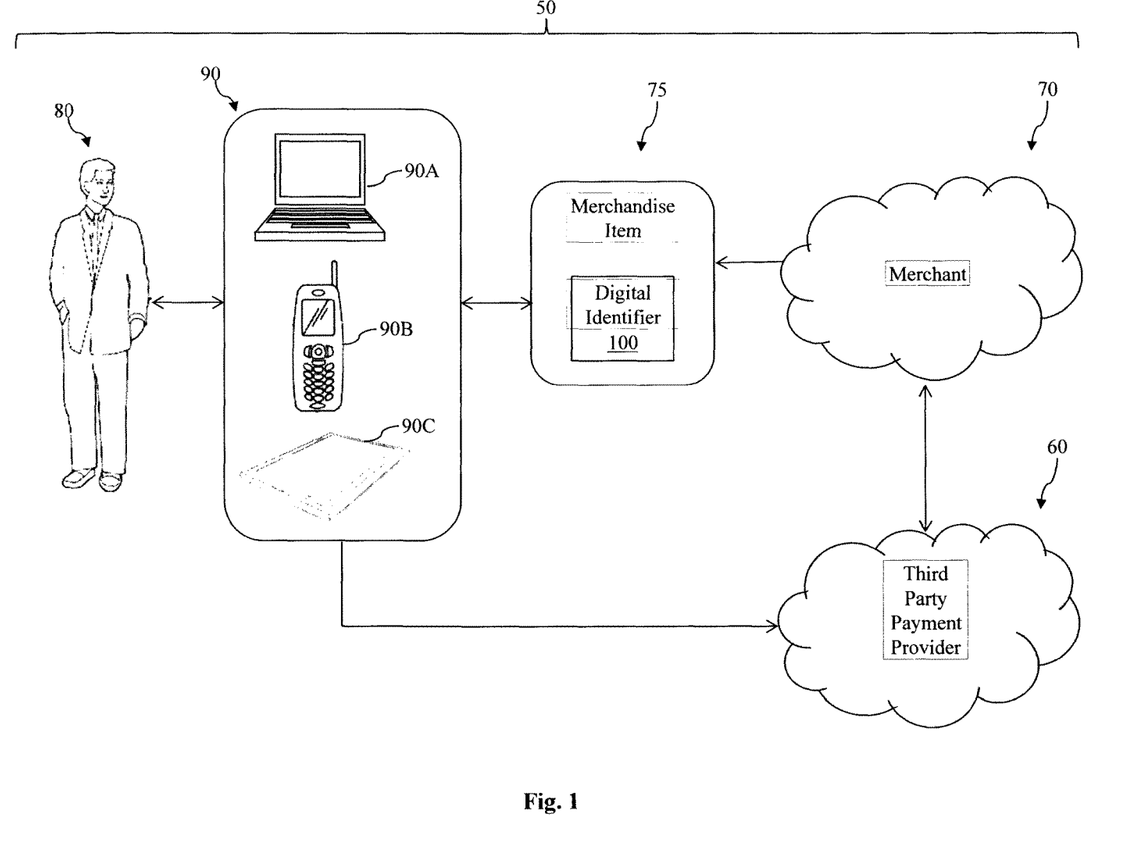
FIG. 1 is a simplified block diagram illustrating an infrastructure for conducting an electronic transaction according to various aspects of the present disclosure.

FIG. 1 is a simplified high-level block diagram view of an infrastructure (or system) 50 over which the electronic commerce can be conducted in accordance with the various aspects of the present disclosure. The infrastructure 50 includes a third party payment provider 60, a merchant 70, and a buyer 80. In various embodiments, the third party payment provider 60 may be a financial institution or a third party payment provider, for example PayPal®, Inc. of San Jose, Calif., or a similar entity.

The merchant 70 may be an entity offering a merchandise item 75 for sale. The merchandise item 75 may be a single product, or may actually include a plurality of physical and tangible products, including (but not limited to) clothing, electronics, tools, toys, pharmaceutical products, household appliances, books, movies, automotive components, sporting goods, groceries, etc. The merchant 70 may also be an entity offering digital goods or services, in which case the merchandise item 75 may include electronic-books, digital music, digital images, digital videos, virtual items, or other subscription-based services, etc.

The buyer 80 is either someone who has already purchased one or more merchandise items 75 from the merchant 70, or a prospective purchaser who may be interested in purchasing one or more merchandise items 75 from the merchant 70. For ease of reference, the buyer 80 is used herein to collectively refer to the actual purchaser as well as the prospective purchaser. The buyer 80 may also have an account with the third party payment provider 60.

As is shown in FIG. 1, the merchant 70 is configured to conduct electronic communication with external entities, for example the third party payment provider 60. The buyer 80 may also electronically communicate with external entities (e.g., the third party payment provider 60 or the merchant 70) through one or more electronic communications devices 90. As examples, the electronic communications devices 90 may include a computer 90A (either a desktop computer or a laptop computer), a mobile telephone 90B (e.g., a smartphone), or a computer tablet 90C (also referred to as tablet computer). These electronic communications devices 90 may have electronic circuitry and software implemented therein that enables communication with one or more computers of the external entities under a suitable wired or wireless telecommunications protocol.

According to the various aspects of the present disclosure, the merchandise item 75 offered by the merchant 70 has a digital identifier 100 associated with it. The digital identifier 100 may include a barcode, a Quick Response (QR) code, or any other suitable code that can be electronically scanned by an imaging device or manually entered by a user. In some alternative embodiments, the digital identifier 100 may also include physical store receipts. According to the various aspects of the present disclosure, the digital identifier 100 is visible to the buyer 80. In some embodiments, the digital identifier 100 is visible on the merchandise item 75 itself or its packaging. For example, in an manifestation as a barcode or a QR code, the digital identifier may be imprinted on the actual merchandise item (when commercially and practically appropriate) or attached as a part of a printed label on the packaging box of the merchandise item.

In embodiments where only advertisements of the merchandise item 75 (not the merchandise item 75 itself) is sent to a prospective buyer, the digital identifier 100 may be displayed in association with a visual depiction of the merchandise item 75. For example, a picture, a model, or even a verbal description of the merchandise item 75 may be shown in the advertisement. The advertisement may include a flyer, a catalog, a brochure, etc., which may either be in a paper form (deliverable to the buyer 80 through mail) or in an electronic form (deliverable to the buyer 80 electronically, for example through email). The corresponding barcode or QR code (i.e., examples of the digital identifier 100) of the merchandise item 75 may be displayed adjacent to, or on the picture, model, or verbal description of the merchandise item 75, so as to inform the prospective buyer of their association.

The digital identifier 100 may be generated by the merchant 70 or by the third party payment provider 60. In some embodiments, the digital identifier 100 is generated in a manner so that it is unique to the specific type of merchandise item 75. Stated differently, different types of merchandise items offered by the merchant 70 will each have their own unique digital identifiers, but the same type of merchandise items (e.g., a set of golf clubs with a specific make and model) will have identical digital identifiers 100.

In other embodiments, the digital identifier 100 is generated in a manner so that it is unique to both the merchandise item 75 and the buyer 80. Using the example of the golf clubs, even if two sets of golf clubs have the same make and model (i.e., they are identical products), they will have uniquely different digital identifiers if they are bought by (or advertised to) different buyers 80.

In various embodiments, either the merchant 70 or the third party payment provider 60 (or both of them) maintains an electronic database that keeps track of the merchandise items (such as the merchandise item 75) sent to the buyers (such as the buyer 80). The database also keeps track of the digital identifier 100 associated with each merchandise item that is sent. For example, a pharmacy (an example merchant) may record in its electronic database a transaction in which a bottle of Zoloft® pills is shipped to, or has been picked up by, John Doe (an example buyer) on Jan. 1, 2012. A unique digital identifier, for example 5645896254, is generated and associated with the bottle of Zoloft as the merchandise item 75 and with John Doe as the buyer 80. This unique digital identifier is also recorded in the electronic database, for example in the same database entry as the transaction itself. The transaction entry may also include other transactional details such as John Doe's address and/or payment information. In embodiments where John Doe already has an account with the payment provider 60, some of the transactional details (including John Doe's address and payment information) may be retrieved from his account with the third payment party provider 60.

When John Doe receives the Zoloft®, the digital identifier associated with it may be visibly printed on the bottle of the pills. At a later point in time, for example Feb. 10, 2012, the buyer John Doe may decide that he needs a refill of the Zoloft®. According to the various aspects of the present disclosure, John Doe can order a refill of the Zoloft® simply by obtaining and submitting the digital identifier associated with the Zoloft®. In some embodiments, using the electronic communications device 90, John Doe can electronically scan an image of the digital identifier. The mobile phone 90B and tablet computer 90C typically include one or more cameras that may be used to perform the scanning of the digital identifier. After the scan is complete, the mobile phones 90B or the tablet computer 90C may then be used to electronically submit (for example via a transceiver) the scanned digital identifier to the merchant 70 or the third party payment provider 60 (or both). Alternatively, using the computer 90A, the mobile phone 90B, or the tablet computer 90C, John Doe may also manually submit the digital identifier by typing it in a website (or another suitable electronic application). The website (or the electronic application) will then send the digital identifier back to the merchant 70 or the third party payment provider 60.

When the merchant 70 or the third party payment provider 60 detects the submission of the digital identifier associated with the Zoloft® from John Doe, it will initiate a reorder of the Zoloft®. In some embodiments, John Doe may be prompted to confirm the order after the submission of the digital identifier is detected. In that case, the merchant 70 or the third party payment provider 60 will initiate the reorder of the Zoloft® only after receiving confirmation from John Doe that he indeed wants the reorder.

In embodiments where the third party payment provider 60 handles the purchasing (and reordering) of goods for the merchant 70, the third party payment provider 60 may instruct the merchant to send another bottle of Zoloft® to John Doe in response to detecting the submission of the digital identifier from John Doe. The third party payment provider 60 correctly construes the submission of the digital identifier as a request to reorder the Zoloft®, because Zoloft® from merchant 70 has a matching digital identifier as the one submitted by John Doe. The merchant 70 then sends the refill order of the Zoloft® to John Doe and updates the electronic database accordingly.

It is understood that the refill order of the Zoloft® may or may not have the same digital identifier as the initial order of the Zoloft®. In embodiments where the merchant 70 alone handles its transactions with buyers, the order refill is carried out in a similar manner, except that the merchant 70 may perform the detection of the digital identifier submission and the initiating the order refill steps. In any case, John Doe can order the refill of the Zoloft® without being required to submit or enter his payment or address information, since that is already "on file" (e.g., stored in the electronic database).

Thus, it can be seen that the present disclosure allows the buyer 75 to perform a reorder of a previously-purchased merchandise item 75 by capturing and submitting the unique digital identifier associated with the merchandise item 75. This may be done by an electronic scan or a manual entry of the digital identifier. By doing so, it greatly simplifies the reordering process for the buyer 80, as he/she no longer needs to go through the cumbersome process of having to find the merchant, locate the product of interest, adding the product for purchase (e.g., adding it to a virtual shopping cart), and entering payment and address information again. Rather, with a simple scan (or the like) of the merchandise item, the buyer may order another copy of it. Thus, the present disclosure is particularly useful in situations where the same type of product has to be reordered on a periodic basis, such as pharmacy pills, diapers, cleaning supplies, batteries, etc. Of course, the present disclosure may still offer benefits even for buyers who do not necessarily need to reorder the same type of products all the time. As long as a reorder is desired, the various aspects of the present disclosure may be applied.

In some embodiments, the buyer 80 may be allowed to customize the reorder. To illustrate, at some point in time before the buyer scans the digital identifier 100 associated with the merchandise item 75, he/she may specify a given quantity of the merchandise item 75 to be included in the reorder. As an example, the original quantity purchased may be one, but the buyer 80 may specify that the reorder should include four items. This customization information may also be recorded in the electronic database discussed above. Thus, when the buyer 80 scans and submits the digital identifier 100, the merchant 70 or the third party payment provider 60 will know that the buyer 80 wants four copies of the merchandise item 75 to be sent, rather than just one. As another example, the merchandise item 75 may actually include different types of products A, B, and C. Product A may last for a long time and therefore does not need to be reordered as often, product B has a shorter lifespan than product A and therefore needs to be reordered more frequently, and product C has the shortest lifespan among the three products and therefore needs to be reordered frequently. In that case, the buyer 80 may be allowed to specify that a submission of the digital identifier 100 means that one copy of the product A, two copies of the product B, and four copies of the product C (or any other suitable number) should be sent, since that will better suit the buyer's needs.

The present disclosure may also apply to situations beyond a reordering of a previously-purchased item. In some embodiments, advertisements of the merchandise item may be sent to the buyer 80, who may only be a prospective buyer at this time. As discussed above, the advertisements may be in the form of brochures, catalogs, or flyers in paper or electronic form. Before these advertisements are sent out, each merchandise item is associated with a uniquely generated digital identifier. The association between the merchandise item and the digital identifier, as well as the information of the prospective buyer, are once again recorded in the electronic database.

As the buyer 80 receives the advertisement of the merchandise item, he/she may identify one(s) of interest and order them by capturing and submitting the respective digital identifier associated with each item. The merchant 70 or the third party payment provider 60 may detect the submission of the digital identifiers and may initiate the ordering of their corresponding merchandise items accordingly. To facilitate the transaction, the buyer 80 may elect to enter his/her payment and address information with the merchant 70 and/or with the third party payment provider 60 before capturing and submitting the digital identifiers. On the other hand, if the buyer 80 has not completed this step before the digital identifiers are submitted, the merchant 70 or the third party payment provider 60 may prompt the buyer 80 to enter the payment and address information.

In any case, once the merchant 70 or the third party payment provider 60 obtains the payment and address information from the buyer 80, and the submission a digital identifier has been detected, the merchant 70 or the third party payment provider 60 can proceed in one of two ways according to the buyer's wishes. In some cases, the buyer 80 may specify that a copy of the merchandise item matching the submitted digital identifier be sent to him/her. In other cases, the buyer 80 may specify that a copy of the merchandise item matching the submitted digital identifier be reserved at a physical store of the merchant 70. Regardless of the method chosen by the buyer 80 to get the order refilled, the overall shopping experience is still much more simplified. Of course, the buyer 80 may also be allowed to customize the order in a manner similar to that discussed above.

Figure 2:
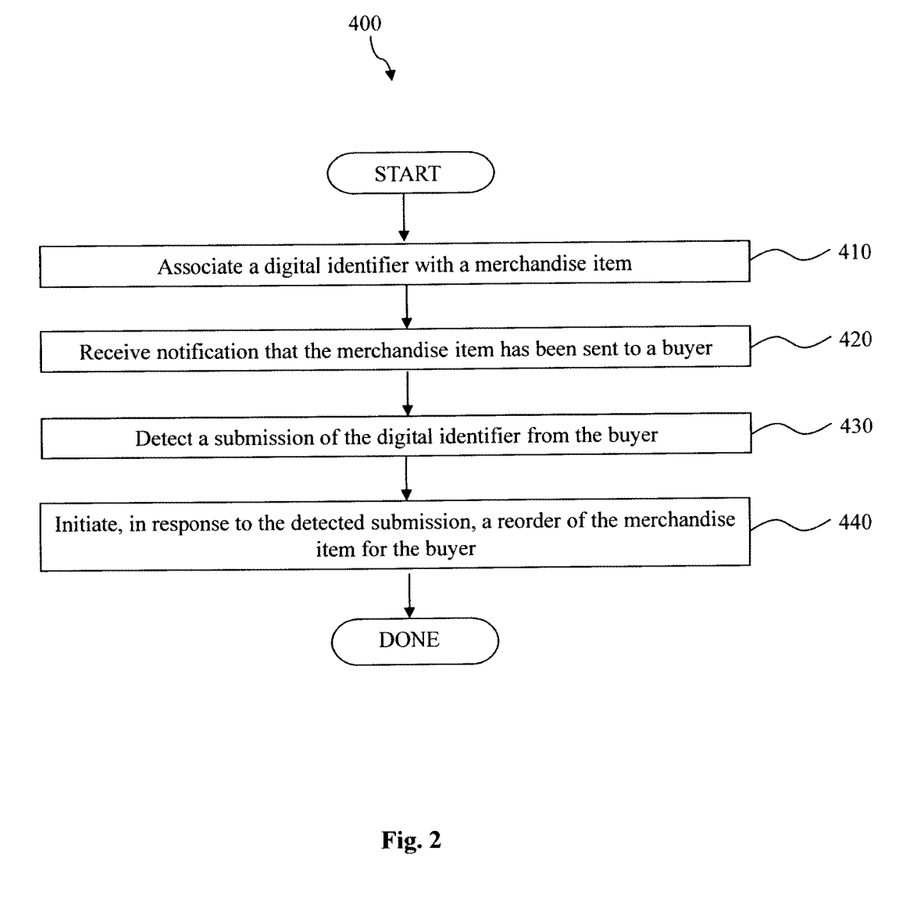
FIGS. 2-3 are example flowcharts of conducting an electronic transaction according to various aspects of the present disclosure.

FIG. 2 is a flowchart illustrating a method 400 of conducting an electronic transaction. The method 400 includes a step 410, in which a digital identifier is associated with a merchandise item. The digital identifier is visible on at least one of: the merchandise item and a packaging of the merchandise item. In some embodiments, the digital identifier includes one of: a barcode and a Quick Response (QR) code. In some embodiments, the digital identifier is generated in a manner so that it is unique to the merchandise item and to the buyer.

The method 400 includes a step 420, in which notification is received that the merchandise item has been sent to a buyer. The notification may be received electronically.

The method 400 includes a step 430, in which a submission of the digital identifier from the buyer is detected. In some embodiments, the step 430 includes detecting an electronic scan of the digital identifier by a portable computing device from the buyer. The portable computing device may be a smartphone, a tablet computer, a laptop computer, a desktop computer, a dedicated electronic scanner, or another suitable electronic device with imaging functionalities. In some other embodiments, the step 430 includes detecting a manual entry of the digital identifier on a web site. For example, the buyer may be able to type in the digital identifier on a suitable web site, and this entry may be detected as a part of the step 430.

The method 400 includes a step 440, in which in response to the detecting, a reorder of the merchandise item for the buyer is initiated. In some embodiments, the step 440 is performed without requiring the buyer to enter its payment information and its address information.

In some embodiments, steps 410-440 are performed by a third party payment provider. In other embodiments, steps 410-440 are performed by a merchant offering the merchandise item for sale.

It is understood that at least some of the steps 410-440 are performed at least in part by one or more electronic processors. It is also understood that additional method steps may be performed before, during, or after the steps 410-440 discussed above. For example, in some embodiments, the method 400 may include a step of allowing the buyer to customize a reorder of the merchandise item, and a step of fulfilling the reorder of the merchandise item according to the manner customized by the buyer. For example, the merchandise item may include a plurality of products, and the buyer may be allowed to specify a quantity of each of the products for the reorder as a part of the customization. It is also understood that one or more of the steps of the method 400 described herein may be omitted, combined, or performed in a different sequence as desired.

Figure 3:
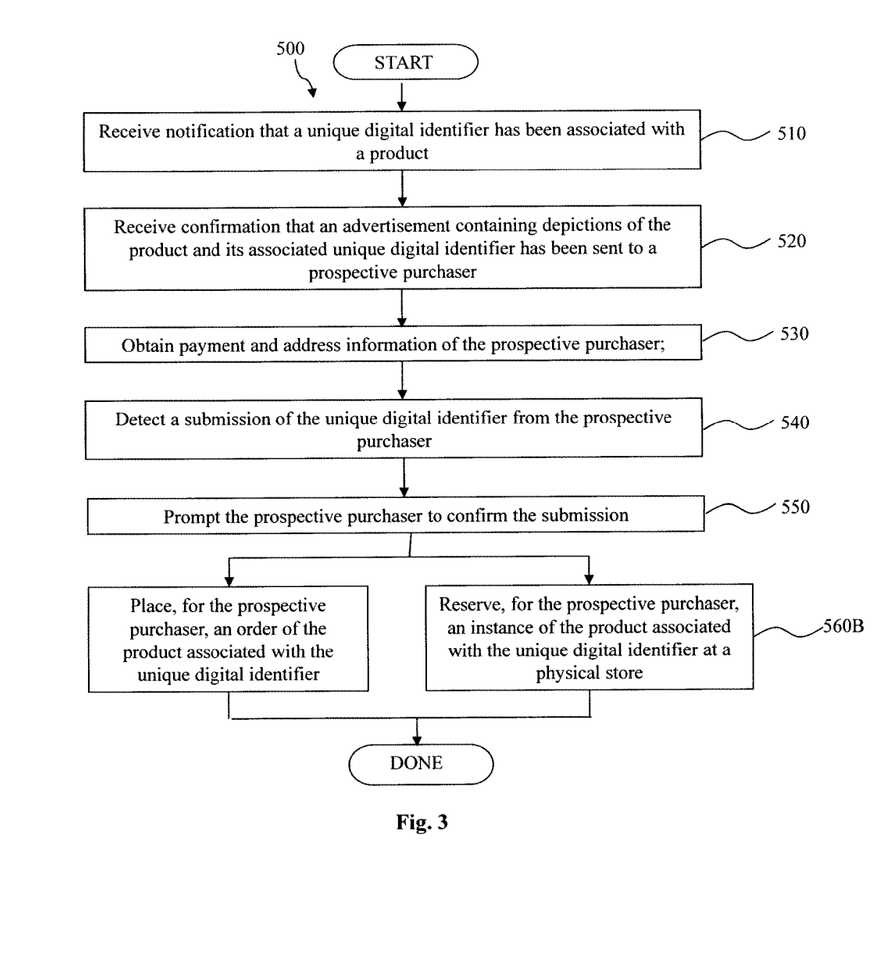

FIG. 3 is a flowchart illustrating a method 500 of conducting an electronic transaction. The method 500 includes a step 510, in which notification is received that a unique digital identifier has been associated with a product. In some embodiments, the unique digital identifier includes one of: a barcode and a Quick Response (QR) code.

The method 500 includes a step 520, in which confirmation is received that an advertisement containing depictions of the product and its associated unique digital identifier has been sent to a prospective purchaser.

The method 500 includes a step 530, in which payment and address information of the prospective purchaser is obtained.

The method 500 includes a step 540, in which a submission of the unique identifier is detected from the prospective purchaser. In some embodiments, the step 540 includes detecting an electronic scan of the digital identifier by a portable computing device from the buyer. The portable computing device may be a smartphone, a tablet computer, a laptop computer, a desktop computer, a dedicated electronic scanner, or another suitable electronic device with imaging functionalities. In some other embodiments, the step 540 includes detecting a manual entry of the digital identifier on a web site. For example, the buyer may be able to type in the digital identifier on a suitable web site, and this entry may be detected as a part of the step 540.

The method 500 includes a step 550, in which the prospective purchaser is prompted to confirm the submission.

After the step 550 is performed, and a confirmation of the submission is received from the prospective purchaser, the method proceeds with one of the two steps 560A or 560B. In step 560A, an order is placed for the prospective purchaser. The order involves the product that is associated with the unique digital identifier. In step 560B, an instance (or copy) of the product associated with the unique digital identifier is reserved at a physical store for the prospective purchaser. Regardless of whether the step 560A or the step 560B is performed, they are performed without requiring the prospective purchaser to enter its payment and address information In some embodiments, steps 510-560 are performed by a third party payment provider. In other embodiments, steps 510-560 are performed by a merchant offering the merchandise item for sale.

It is understood that at least some of the steps 510-560 are performed at least in part by one or more electronic processors. It is also understood that additional method steps may be performed before, during, or after the steps 510-560 discussed above. For example, in some embodiments, the method 500 may include a step of allowing the buyer to customize an order of the product. For example, the product may include a plurality of items, wherein the buyer is allowed to specify a quantity of each of the items as a part of the customization. The product will then be placed (in step 560A) or reserved (in step 560B) according to the manner in which it is specified by the prospective purchaser. It is also understood that one or more of the steps of the method 500 described herein may be omitted, combined, or performed in a different sequence as desired.

Figure 4:
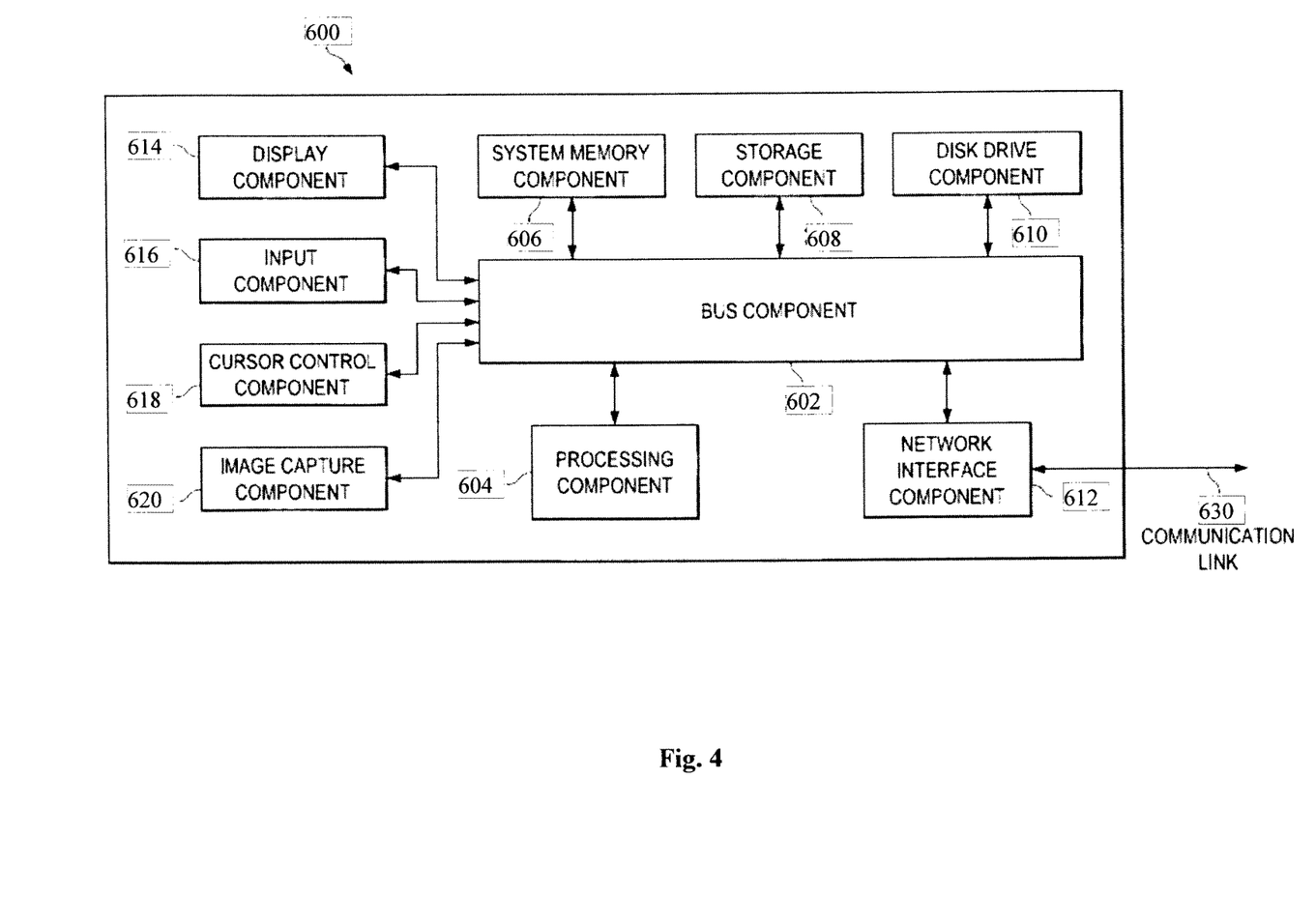
FIG. 4 is an example computer system for implementing the various steps of the methods of FIGS. 2-3 according to various aspects of the present disclosure

FIG. 4 is a block diagram of a computer system 600 suitable for implementing various methods and devices described herein, for example, the various method steps of the methods 400 and 500. In various implementations, the devices capable of performing the steps may comprise a network communications device (e.g., mobile cellular phone, laptop, personal computer, tablet, etc.), a network computing device (e.g., a network server, a computer processor, an electronic communications interface, etc), or another suitable device. Accordingly, it should be appreciated that the devices capable of implementing the method 400 and 500 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 5:
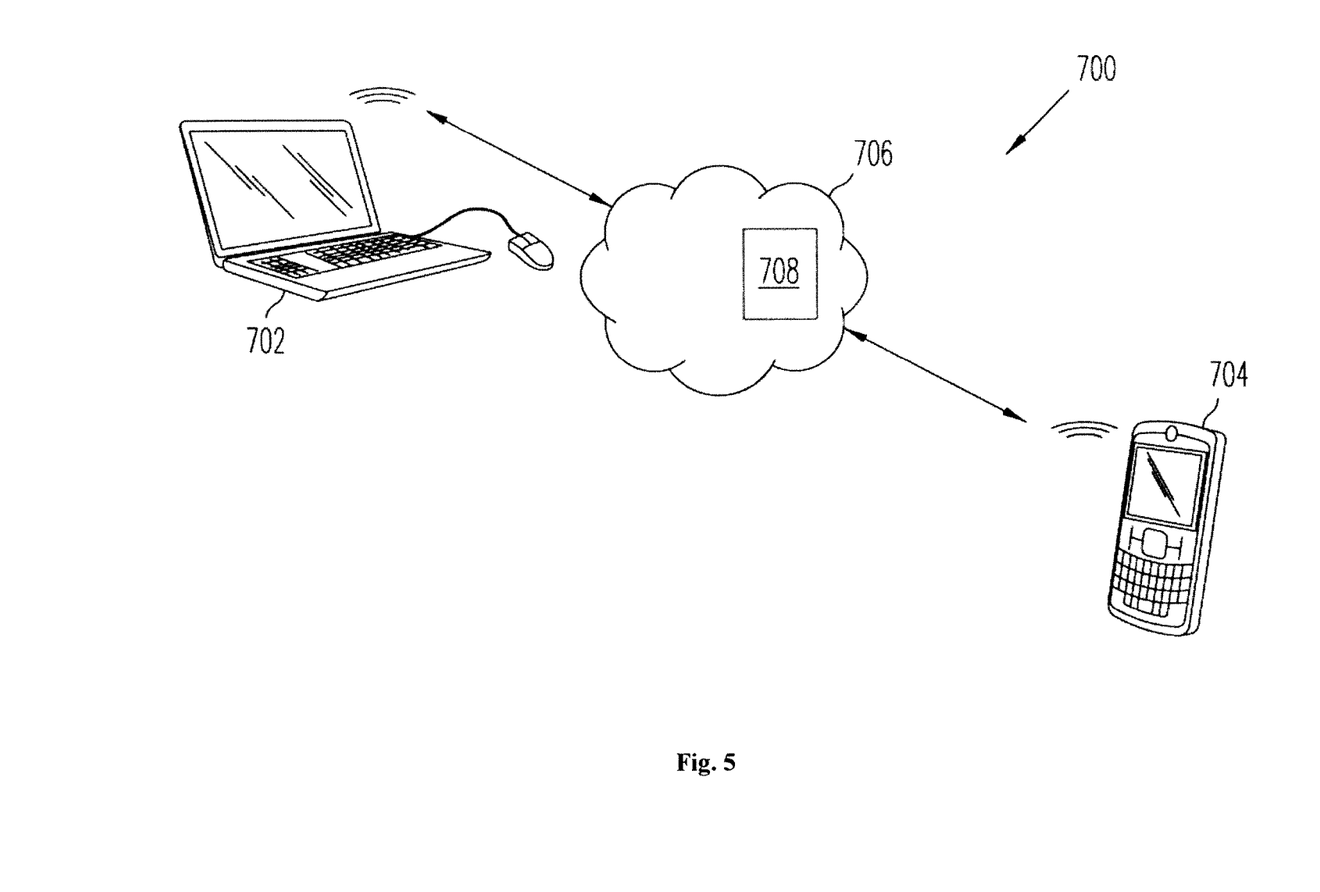
FIG. 5 is a simplified example of a cloud-based computing architecture according to various aspects of the present disclosure.

FIG. 5 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an app with functionalities described above with reference to FIGS. 1-4.

The mobile device 704 is in communication with cloud-based resources 708, which may include one or more computers, such as server computers, with adequate memory resources to handle requests from a variety of buyers. A given embodiment may divide up the functionality between the mobile device 704 and the cloud-based resources 708 in any appropriate manner. For example, an app on mobile device 704 may perform basic input/output interactions with the buyer, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/buyer may access information from the cloud-based resources 708 by logging on to a merchant account or a buyer account at computer 702.

It is understood that the various components of cloud-based computing architecture 700 are shown as examples only. For instance, a given buyer may access the cloud-based resources 708 by a number of devices, not all of the devices being mobile devices. Similarly, a merchant or another buyer may access resources 708 from any number of suitable mobile or non-mobile devices. Furthermore, the cloud-based resources 708 may accommodate many merchants and buyers in various embodiments.

Figure 6:
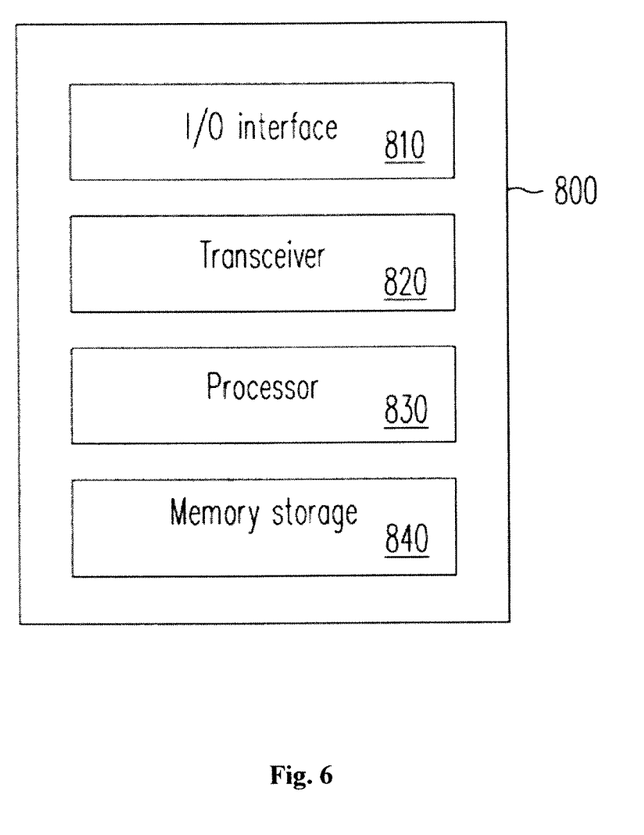
FIG. 6 is a simplified block diagram of an electronic system for implementing various methods and devices described according to various aspects of the present disclosure.

FIG. 6 is a simplified block diagram of an electronic system 800 for facilitating electronic commerce. For example, the electronic system 800 may be used by a third party payment provider to carry out the steps for conducting the electronic commerce transactions discussed herein. In some embodiments, the electronic system 800 may include one or more computer servers operable to perform the methods 400 or 500 of FIGS. 2-3.

The electronic system 800 includes an input/output interface module 810. The interface module 810 is operable to receive an input from an external entity and communicate an output to the external entity. The external entity may include a merchant or a consumer. In an embodiment, the input/output interface module 810 includes a visual display unit. The input/output interface module 810 may also include physical and/or virtual buttons, keyboards, mouse, track balls, speakers, microphones, light-sensors, light-emitting diodes (LEDs), communications ports (such as USB or HDMI ports), joy-sticks, image-capture devices (for example cameras), etc.

The electronic system 800 includes a transceiver module 820. The transceiver module 820 contains various electronic circuitry components configured to conduct telecommunications with one or more external devices. The electronic circuitry components allow the transceiver module 820 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the transceiver module 820 includes antennas, filters, low-noise amplifiers, digital-to-analog (DAC) converters, analog-to-digital (ADC) converters, and transceivers. The transceiver module 820 may further include circuitry components such as mixers, amplifiers, oscillators, phase-locked loops (PLLs), and/or filters. Some of these electronic circuitry components may be integrated into a single discrete device or an integrated circuit (IC) chip.

The electronic system 800 also includes a computer processor module 830 that is operable to execute computer instructions. The computer processor module 830 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code.

The electronic system 800 includes a memory storage module 840. The memory storage module 840 may contain various forms of digital memory, such as hard disks, FLASH, SRAM, DRAM, ROM, EPROM, memory chips or cartridges, etc. Computer programming code may be permanently or temporarily stored in the memory storage module 840, for example. The processor module 830 may be used to execute the computer programming code stored in the memory storage module 840.

The memory storage module 840 also contains a program module that is configured to facilitate the electronic transactions according to the present disclosure. For example, the program module operates to provide actions, such as associate digital identifiers with merchandise items, detecting submissions of digital identifiers, and initiating reorders of the merchandise items associated with the digital identifiers, etc.

In some embodiments, the electronic system 800 may also be implemented on a portable electronic device such as a mobile telephone or a computer tablet.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a system. The system includes: a computer memory storage module configured to store executable computer programming code; and a computer processor module operatively coupled to the computer memory storage module, wherein the computer processor module is configured to execute the computer programming code to perform the following operations: associating a digital identifier with a merchandise item; receiving notification that the merchandise item has been sent to a buyer; thereafter detecting a submission of the digital identifier from the buyer; and initiating, in response to the detecting, a reorder of the merchandise item for the buyer.

Yet another aspect of the present disclosure involves a method of conducting an electronic transaction. The method includes: associating a digital identifier with a merchandise item; receiving notification that the merchandise item has been sent to a buyer; thereafter detecting a submission of the digital identifier from the buyer; and initiating, in response to the detecting, a reorder of the merchandise item for the buyer; wherein at least one of the associating, the receiving, the detecting, and the initiating is performed at least in part by one or more electronic processors.

One more aspect of the present disclosure involves a method of conducting an electronic transaction. The method includes: receiving notification that a unique digital identifier has been associated with a product; receiving confirmation that an advertisement containing depictions of the product and its associated unique digital identifier has been sent to a prospective purchaser; detecting a submission of the unique digital identifier from the prospective purchaser; prompting the prospective purchaser to confirm the submission; and performing, in response to receiving a confirmation of the submission from the prospective purchaser, one of the two following actions: placing, for the prospective purchaser, an order of the product associated with the unique digital identifier; and reserving, for the prospective purchaser, an instance of the product associated with the unique digital identifier at a physical store; wherein at least one of the receiving the notification, the receiving the confirmation, the detecting, the prompting, and the performing is executed at least in part using one or more electronic processors.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A cloud-based system, comprising:
a non-transitory memory storing instructions; and
one or more hardware processors coupled to the non-transitory memory and configured to read the instructions from the non-transitory memory to cause the cloud-based system to perform operations comprising:
generating a machine-readable digital identifier for a buyer, the digital identifier uniquely identifying the buyer, and the digital identifier including a barcode and scannable by a camera of a mobile device of the buyer;
receiving a notification that a merchandise item has been sent to the buyer, the merchandise item comprising a first product and a second product, the first product having a longer lifespan than the second product;
customizing a reorder of the merchandise item, the customizing comprising specifying, based on input from the buyer, a grouping of the first product and the second product such that there is a greater number of the second product than the first product;
associating a submission of the digital identifier with the customized reorder of the merchandise item;
thereafter detecting, via the Internet, the submission of the digital identifier triggered by an electronic scan of said digital identifier through the camera and a mobile app running on the mobile device; and
initiating, in response to the detecting and without requiring the buyer to enter payment information or address information, the customized reorder of the merchandise item associated with the digital identifier for the buyer according to the specified grouping of a number of the first product and a number of the second product.

2. The cloud-based system of claim 1, wherein the digital identifier is visible on at least one of: the merchandise item or a packaging of the merchandise item.

3. The cloud-based system of claim 1, wherein the digital identifier further includes a digital code, and wherein the detecting comprises detecting a manual entry of the digital code through a web site.

4. The cloud-based system of claim 1, wherein the barcode comprises a quick response (QR) code.

5. The cloud-based system of claim 1, wherein the initiating comprises reserving the customized reorder of the merchandise item at a physical store.

6. The cloud-based system of claim 1, wherein the operations further comprise displaying a visual depiction of the merchandise item adjacent to the digital identifier.

7. The cloud-based system of claim 6, wherein the visual depiction includes a picture or a verbal description of the merchandise item.

8. The cloud-based system of claim 1, wherein the digital identifier uniquely identifies the merchandise item.

9. A method of conducting an electronic transaction, comprising:
generating a machine-readable digital identifier for a buyer scannable by a camera of a mobile device of the buyer, the digital identifier uniquely identifying the buyer, and the digital identifier including at least one of: a barcode or a Quick Response (QR) code;
receiving a notification that a merchandise item has been sent to the buyer, the merchandise item comprising a first product and a second product, the first product having a longer lifespan than the second product;
customizing a reorder of the merchandise item, the customizing comprising specifying, based on input from the buyer, a grouping of the first product and the second product such that there is a greater number of the second product than the first product;
associating a submission of the digital identifier with the customized reorder of the merchandise item;
thereafter detecting, via Internet, the submission of the digital identifier triggered by an electronic scanning of said digital identifier through the camera and a mobile app running on the mobile device; and
initiating, in response to the detecting and without requiring the buyer to enter payment information or address information, the customized reorder of the merchandise item associated with the digital identifier for the buyer according to the specified grouping of a number of the first product and a number of the second product;
wherein one or more of the generating, the receiving, the customizing, the associating, the detecting, and the initiating are performed by one or more electronic processors of a cloud-based server that is coupled to the mobile device via the Internet.

10. The method of claim 9, wherein the associating is performed so that the digital identifier is visible on at least one of: the merchandise item or a packaging of the merchandise item.

11. The method of claim 9, wherein the digital identifier further includes a digital code, and wherein the detecting comprises detecting a manual entry of the digital code on a web site.

12. The method of claim 9, wherein the cloud-based server is associated with a third party payment provider.

13. The method of claim 9, wherein the cloud-based server is associated with a merchant offering the merchandise item for sale.

14. The method of claim 9, wherein the initiating comprises reserving the customized reorder of the merchandise item at a physical store.

15. The method of claim 9, further comprising displaying a visual depiction of the merchandise item adjacent to the digital identifier.

16. The method of claim 15, wherein the visual depiction includes a picture or a verbal description of the merchandise item.

17. The method of claim 9, wherein the digital identifier uniquely identifies the merchandise item.

18. A method of conducting an electronic transaction, comprising:
    generating a unique digital identifier that is machine-readable for a buyer scannable by a camera of a mobile device of the buyer, the unique digital identifier uniquely identifying the buyer, and the digital identifier including at least one of: a barcode or a Quick Response (QR) code;
    customizing a reorder of a merchandise item comprising a first product and a second product, the first product and the second product being different types of products and having different lifespans, the customizing comprising specifying, based on input from the buyer, a grouping of different quantities of the first product and the second product;
    associating a submission of the digital identifier with the customized reorder of the merchandise item according to the specified grouping;
    detecting, via Internet, the submission of the unique digital identifier triggered by an electronic scanning of the unique digital identifier through the camera and a mobile app running on the mobile device;
    prompting the buyer to confirm the submission via the mobile app; and
    performing, in response to receiving a confirmation of the submission from the buyer, at least one of the following:
        placing, for the buyer and without requiring the buyer to enter payment information or address information, an order of the merchandise item associated with the unique digital identifier according to the specified grouping of the different quantities of the first product and the second product; and
        reserving, at a physical store for the buyer, an instance of the merchandise item associated with the unique digital identifier according to the specified grouping of the different quantities of the first product and the second product;
    wherein at least one of the generating, the customizing, the associating, the detecting, and the performing is executed at least in part using one or more electronic processors of a cloud-based server that is coupled to the mobile device via the Internet.

19. The method of claim 18, wherein the digital identifier further contains a digital code, and wherein the detecting further comprises:
    detecting a manual entry of the digital code on a web site.

20. The method of claim 18, wherein the cloud-based server is associated with a third party payment provider.

21. The method of claim 18, wherein the cloud-based server is associated with a merchant selling the merchandise item.

22. The method of claim 18, wherein the first product has a longer lifespan than the second product, and wherein the customizing the reorder comprises specifying the grouping such that the grouping contains a greater quantity of the second product than the first product.

23. The method of claim 18, further comprising displaying a visual depiction of the merchandise item adjacent to the digital identifier.

24. The method of claim 23, wherein the visual depiction includes a picture or a verbal description of the merchandise item.

25. The method of claim 23, wherein the visual depiction is displayed in an electronic form.

26. The method of claim 18, wherein the digital identifier uniquely identifies the merchandise item.

* * * * *